United States Patent [19]
Levesque

[11] 4,060,007
[45] Nov. 29, 1977

[54] CLUTCH TEETH
[75] Inventor: George N. Levesque, Warwick, R.I.
[73] Assignee: Brown & Sharpe Manufacturing Company, North Kingstown, R.I.
[21] Appl. No.: 722,481
[22] Filed: Sept. 13, 1976
[51] Int. Cl.² .................... F16H 55/08; F16D 11/04; B23F 1/00; B23F 9/00
[52] U.S. Cl. ........................................ 74/457; 90/1; 90/5; 90/9.4; 192/67 R
[58] Field of Search ................... 74/457, 462; 90/1.4, 90/1.6 R, 1.6 A, 5, 9.4, 1; 192/66, 67 R

[56] References Cited
U.S. PATENT DOCUMENTS
3,184,988 5/1965 Osplack et al. .................... 74/462 X Primary Examiner—Leonard H. Gerin
Attorney, Agent, or Firm—Barlow & Barlow

[57] ABSTRACT

This invention relates to a clutch tooth design which provides increased load carrying ability by having substantial face to face contact of the teeth during a partial engagement of the clutch teeth. The teeth of the clutch are machined to a profile form which is of exponential shape. Mating contact areas lie in a mid-pitch plane perpendicular to the axis of rotation of the clutch. The mutual tangent between two contacting teeth lies in a truly helicoid surface. The essential line contacts resulting from machining are converted by a coining process to areas large enough to carry the service loads. As a result the tooth form developed actually improves with continued use.

4 Claims, 6 Drawing Figures

CLUTCH TEETH

BACKGROUND OF THE INVENTION

This invention relates to clutch teeth particularly for use in positive drive clutches or index couplings requiring high accuracy and where the parts undergo frequent engagement and disengagement. For example, tooth index couplings are used to obtain angularly spaced positions on rotary tables and tool index turrets. Such a coupling type is shown in U.S. Patent to Muller U.S. Pat. No. 2,202,117.

In use, the coupling members are tightly held in mesh by heavy springs or by hydraulic or pneumatic cylinders. To accomplish indexing the coupling members are axially separated and moved in some manner to a new location where the two coupling members are again squeezed tightly together. In general, the mechanism used to obtain the relative rotation is only approximate and as the coupling is engaged, there must be a slight rotation caused by the coupling teeth to reach the exact final location.

Very high accuracy is often required of these devices with some grades offered with less than 3 seconds of arc error. To retain this high accuracy, the prior art couplings for accurate indexing are made of hardened steel. Two such coupling designs are widely used. One is the "Curvio" curved-tooth coupling, and the other is the straight sided Hirth design. Neither of these couplings make use of the helicoid tooth form to obtain the desired accuracy. Both designs require a grinding operation after the coupling members are hardened. The hard surfaces are necessary, because as the teeth engage, there is only a theoretically very small area of contact and therefore, high stresses especially if fast operation and many operations are required.

To obtain better contact conditions on engagement coupling devices have been made which have a helicoid tooth form. For instance, Wildhaber shows in U.S. Pat. No. 2,654,456 a helicoid form of tooth chamfering. The clutch tooth design disclosed by Zieher in U.S. Pat. No. 2,950,797 attempts to improve conditions by combining a narrow band, which has flat engaging areas like the Hirth coupling with curved portions blended thereto. However, even with this design, there is still only contact at the extreme outside radius until the final engagement is reached. Moosmann, U.S. Pat. No. 3,820,412, shows a tooth form where the shape in the fully seated area is of helicoid form.

The term helicoid surface means a surface generated by a radial line which rotates about its axis and advances along the axis with a fixed relation between the two rates of motion.

We find that the helicoid tooth forms of the prior art are not suitable for a high accuracy coupling. The machinery necessary to produce the Moosmann design makes it very difficult to achieve the high precision required.

SUMMARY OF THE INVENTION

The present invention achieves the helicoid shape in the working area of the tooth in a very simple manner. A form cutter machines the teeth and a subsequent coining operation achieves the desirable helicoid form at the mating areas. The tooth contact area is progressively enlarged to carry the service load and during continued use the indexing accuracy actually improves.

The present invention involves a tooth shape where the slope of the face of the tooth is cut with a form cutter which produces a form wherein the cross section thereof is of exponential shape. To accomplish this, the present invention achieves a helicoid shape in the working area of the tooth along the pitch line by utilizing a cutter which cuts the form that can be defined generally by the formula $X = Ke^{ky}$ where X is the distance from the center line, $e$ is the base of natural logarithms and $y$ is the height of the tooth face. The exponential curve is chosen so that the mating contact areas are at the flat mid-plane between the coupling teeth. Also the mating contact areas lie in mutually shared helicoid surfaces. The tooth form is machined by a cutter which has the desired cross section, the cutter moving on an axis perpendicular to the rotational axis of the clutch and being traversed in a plane which passes through the axis of the clutch and is slightly inclined to the pitch plane. For example, as the cutter is traversed outward cutting the tooth form, it traverses slightly downward so that the width at the pitch plane is just correct for mating with another member of the same shape. The cutter form is such that the slope is inversely proportional to the radial distance from the center of the coupling and, since the width of the tooth space is proportional to the radial distance from the center, the cutter cuts an exponential shape utilizing a simple cutting action to generate the teeth. Some residual errors do exist after the tooth cutting and accordingly a coining process is used to remove these residual errors and at the same time develop an essentially constant width band of contact to give adequate load carrying capacity. It has been shown, for example, in a coupling with 120 teeth having an outside diameter of 175 millimeter and mid size diameter of 134 millimeter and a material having a Rockwell "C" hardness of 27 to 32, that a coining force of 100 tons is satisfactory to produce a contact area approximately one-half a millimeter wide.

DESCRIPTION OF THE PREFERRED EMBODIMENT

Figure 1:
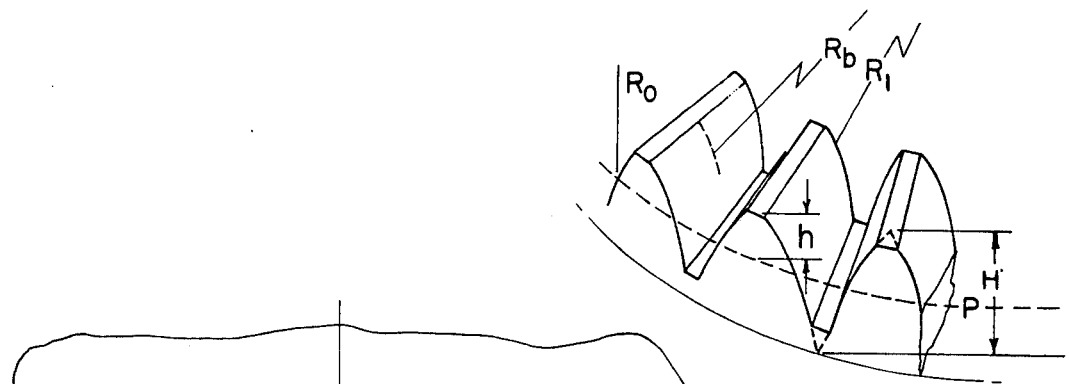
FIg. 1 is a perspective view of a portion of a clutch coupling illustrating the tooth arrangement.

Referring to FIG. 1 there is shown a portion of a clutch tooth coupling which is substantially a cylindrical plate member having a plurality of radial teeth around the periphery thereof. The teeth extend above and below a pitch plane P and the dimension H is the theoretical height of the tooth if the teeth were fully warped surfaces extending to sharp corners; R is the radius at some cylindrical section through the tooth. $R_b$ is the base radius for a normal pressure angle. $\theta$ is the pressure angle of the tooth and X will be the horizontal distance from the center of the tooth space to the tooth contour and Y is the distance above the mean plane. (see FIG. 2.); Z is the distance of the cutter axis of rotation above the mean plane required at the base radius location (see FIG. 4); N equals the number of the teeth of the coupling; e is the base of natural logarithm.

To simplify the computations two approximations are made which do not substantially affect results for couplings having at least 120 teeth. First the distances across the tooth space are taken as equal to the developed arc length and secondly, although the tooth path is at a small angle, the vertical distances are taken to be the same as if the path were flat.

In order to use a single cutter to generate the tooth space in one pass the cutter half width at the mean plane at any radius "R" must correspond to the necessary space width $$X = (\pi \cdot R)/(2 \cdot N) \quad (1)$$

The pressure angle or slope also required from the cutter must be given by $$dx/dy = (\pi \cdot R)/cN \cdot h) \quad (2)$$

The single cutter must have both relations 1 and 2 together which requires that $$dx/dy = (2X)/h$$

The above differential equation has the well known solution $$X = Ke^{2y/h}$$

The unknown constant $K$ must be $$\pi R_b/2N$$

to give the correct result when "Y" is zero at the base radius location

Then $$X = \frac{\pi R_b}{2N} e^{\frac{2y}{h}}$$

also since $$h = \frac{\pi R_b}{N \tan \theta_b}$$

We have the slope to be generated by the cutter as $$X = \frac{\pi R_b}{2N} e^{\left(\frac{2N \tan \theta_b}{\pi R_b}\right)y}$$

To generate the required tooth form along the entire tooth length the cutter must travel along a path inclined slightly to the line perpendicular to the coupling axis. To find the amount, "Z", above the mean plane of the cutter axis of rotation, we note that for the cutter space, equation 3 must hold while on the tooth at the same radius, equation 1 is true. To have a match, "Z" must equal the negative of "Y" or $$\frac{\pi R}{2N} = \frac{\pi R_b}{2N} e^{[-\left(\frac{2N \tan \theta_b}{\pi R_b}\right)z]}$$

or $$Z = -\frac{2N \tan \theta}{\pi R_b} \ln\left(\frac{R}{R_b}\right)$$

or

-continued $$Z = \frac{2N \tan \theta_b}{\pi R_b} \ln\left(\frac{R_b}{R}\right)$$

To illustrate the derivation of tooth cutting data for the 120 tooth coupling with 25° pressure angle at 80mm base radius:

$$H = \frac{\pi \cdot 80}{120 \tan 25°} = 4.4915$$

and $$X = 1.0472 \, e^{\frac{y}{2.2457}}$$

To make the cutter it is convenient to have a tabulation of the form to be cut and to help in fabrication and inspection, the radius of curvature, $\rho$ (see FIG. 2), at various points is also calculated using the formulae $$\rho = \frac{\left[1 + \left(\frac{dx}{dy}\right)^2\right]^{3/2}}{\frac{d^2x}{dy^2}}$$

and $$\frac{dx}{dy} = \frac{X}{2.2457}$$

and $$\frac{d^2x}{dy^2} = \frac{X}{5.0432}$$

For 120 tooth example coupling the nominal depth of the tooth engagement is 2mm with 1mm of each member beyond the mean plane. The cutter is made to cut 1.6mm below the mean plane at the base radius to allow for tooth end clearance and for the amount the cutter is raised in cutting at the inside radius. Also the shape is extended up beyond the working range to a practical width. Below is a tabulation of the cutter work form data. That is, the shape of the space actually generated by the cutter.

| Y,mm | X,mm | Radius, $\rho$,mm |
|---|---|---|
| 2.4 | 3.049 | 7.93 |
| 2.0 | 2.552 | 6.85 |
| 1.4 | 1.953 | 6.01 |
| 1.0 | 1.635 | 5.84 |
| 0.6 | 1.368 | 5.92 |
| 0.2 | 1.145 | 6.23 |
| 0.0 | 1.047 | 6.47 |
| −0.2 | .958 | 6.76 |
| −0.6 | .802 | 7.53 |
| −1.0 | .671 | 8.55 |
| −1.4 | .561 | 9.84 |
| −1.6 | .514 | 10.60 |

In cutting the tooth form the theoretical cutter path should follow the formula $$Z = 2.2457 \ln (80/R)$$

The tabulation below shows the theoretical cutter path data:

| Radius | Cutter height above mean plane at Base Radius |
|---|---|
| 67 | 0.398 |

-continued

| Radius | Cutter height above mean plane at Base Radius |
|---|---|
| 70 | 0.300 |
| 75 | 0.145 |
| 80 | 0.0 |
| 85 | −0.136 |
| 87.5 | −0.201 |

The above line of cutter travel deviates only slightly from a straight path inclined at an angle of 1° and 36 mins. Because of this, the teeth can be cut on a standard machine with a simple wedge under the rotary table used to hold the coupling for machining.

The error caused by this procedure is less than 1/100th of a mm which is accommodated by the coining process.

Figure 3:
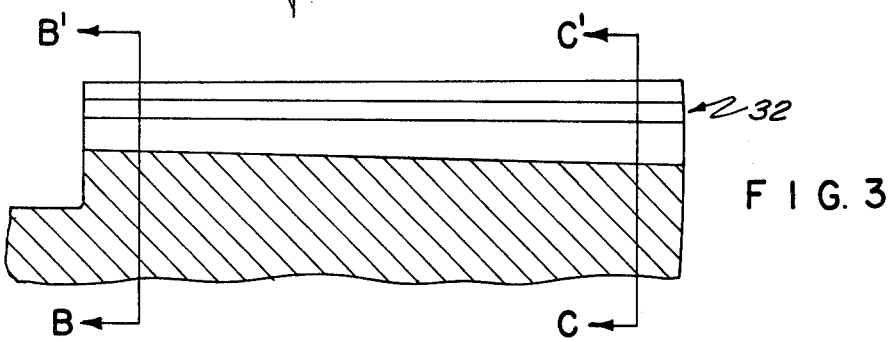
FIGS. 3 and 3A are respectively enlarged sectional elevational views through a tooth and top view of a tooth illustrating the area of contact engagement.
Figure 3A:
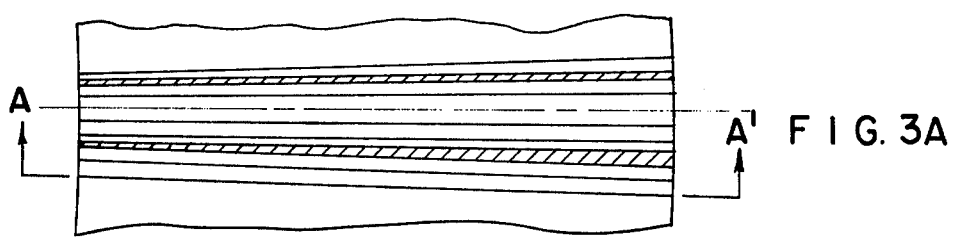
Figure 4:
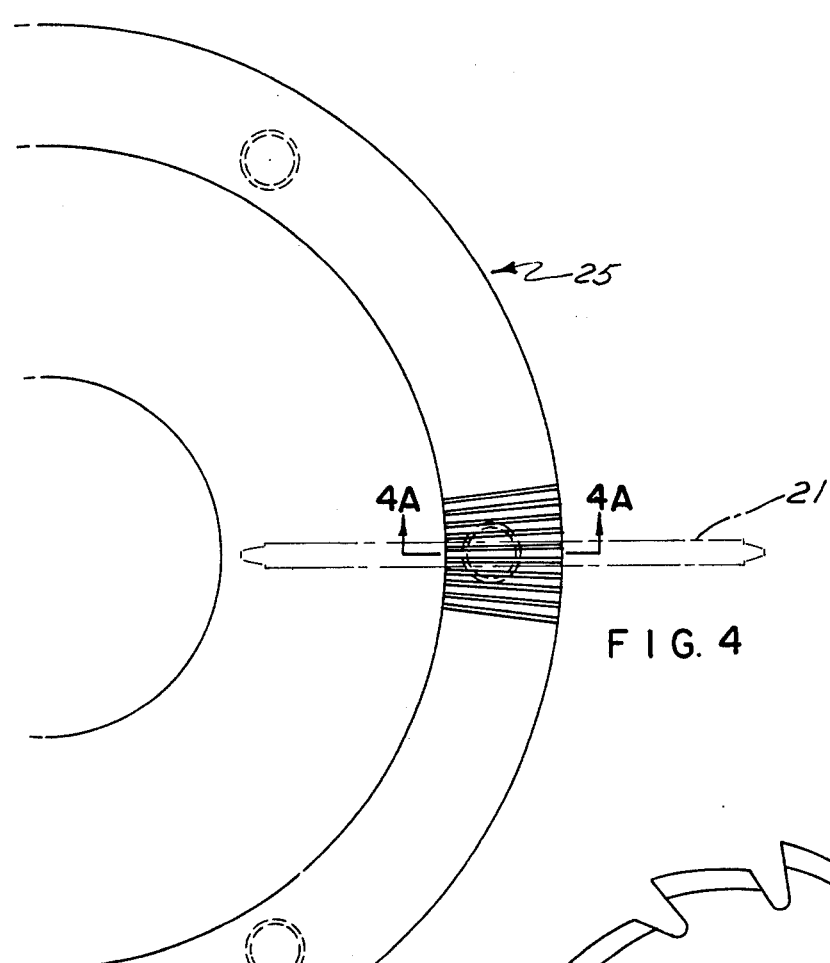
FIGS. 4 and 4A are respectively top views and sectional views of a clutch coupling illustrating the manner of generating the teeth with a simple cutter.
Figure 4A:
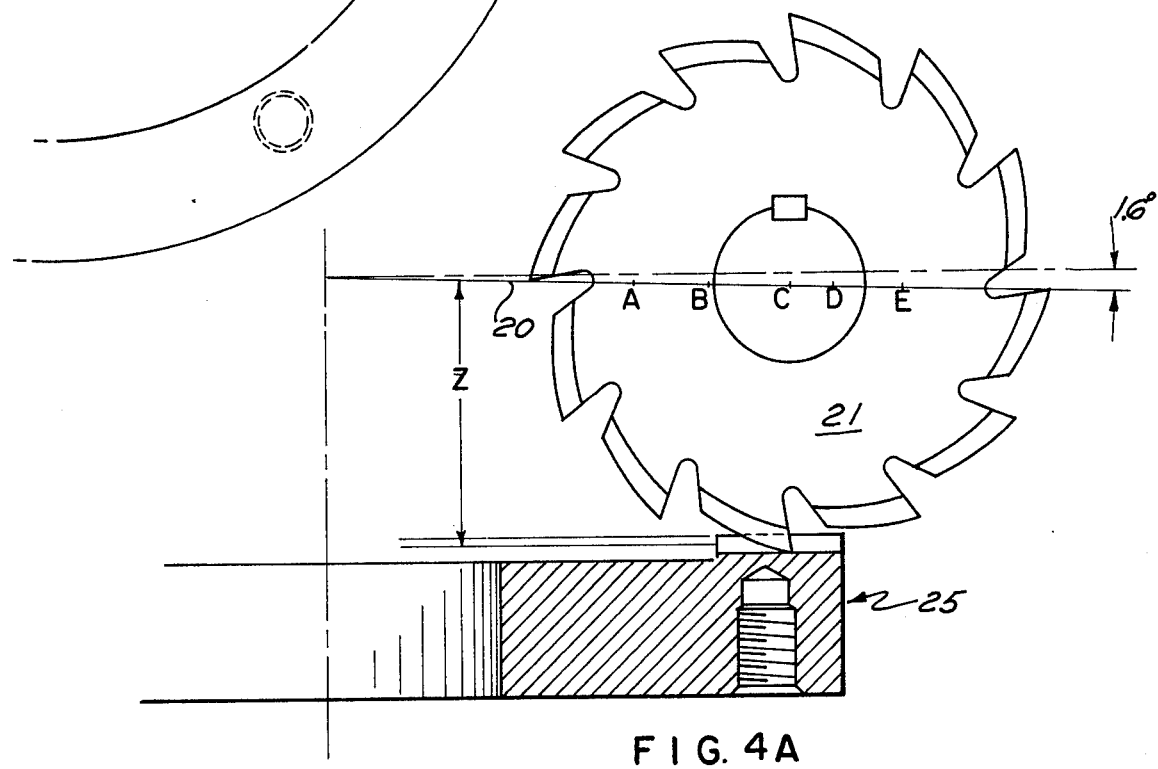

As seen in FIG. 4 and FIG. 4A, the cutter is shown in the cutting cycle of moving on the path designated by the line 20. As the cutter generally designated 21 revolves on its axis, it moves progressively through the points marked B,C,D and E which causes a depthwise feed component. This results in different angles of contact zone changes, the contact zones being cross hatched in FIG. 3. For example, near the inner radius of the tooth which would be in the position B, the contact angle to give an example would be 21.62° and at point D as seen in FIG. 4 the contact zone would be an angle of approximately 26.62°, the angle of the mating helicoidal surfaces varying constantly from the end of the space and then it is moved back to point A and the work is indexed seven teeth and the process of cutting another tooth continues and this is continued until all 120 teeth were cut as shown in the example. Indexing by the prime number of teeth not evenly divisible in the total number of teeth insures that all teeth are cut and that effects of cutter wear is evenly distributed around the clutch. It is, however, not always necessary to index by a prime number. Suppose a clutch had 11 teeth, which is a prime number; then indexing by four, (not prime), secures the proper result. Accordingly, if the number of teeth in the clutch is prime, just about any number above three will distribute the wear very adequately.

Figure 2:
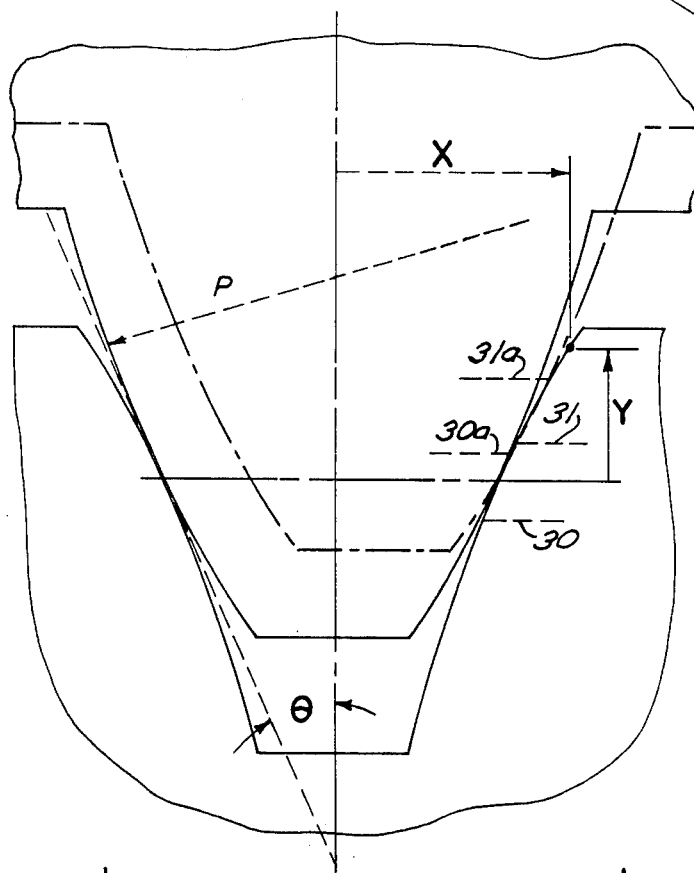
FIG. 2 is an enlarged section taken through partially and fully engaged clutch teeth.

The clutch member 25 will have teeth in which the height will vary from the base radius to the outer radius as seen more particularly in FIG. 3. The tops of the teeth are plane surfaces perpendicular to the clutch axis and as seen more particularly in FIG. 2, there will be produced between lines 30 and 31 and dotted lines 30a and 31a a substantial helicoid surfaces with a constant lead and with a coining operation engaging the mating clutch rings the substantial contact area is produced, and as will be seen in FIG. 2 and FIG. 3 is of substantial extent and fairly uniform from the base radius to the outer radius of the clutch ring. In FIG. 2 the teeth are shown in a position where they might very well engage in broken lines in an indexing type of operation, it being desired to achieve the engagement on the substantial helicoid surfaces which have been generally designated 32. This means that when full engagement is reached as shown in solid lines that engagement will take place with the substantially helicoid surfaces 32 facing each other in the same fashion that they do in a coining operation. To illustrate how the angle of the contact zone changes as the radius is varied, reference might be had to FIG. 3 where two sections labeled B and C are drawn. Section BB is near the inner radius of the tooth where the contact angle, that is the angle, $\theta$, is 21.62° while at section CC the tooth angle is 26.26°. It will therefore be seen that the angle of the mating helicoid surfaces varies constantly from inner to outer radius of the tooth in the clutch coupling.

It will therefore be seen that the clutch teeth are made with very inexpensive cutting processes and allow a subsequent coining operation which develop a mating area of contact along a pitch line which lies in a truly helicoid surface. As can be seen in FIG. 2, as the teeth engage the contact area progressively enlarges to full contact of the area developed in the coining process as a result of the tooth form that is developed. The accuracy of engagement actually improves with use.

I claim:

1. A clutch ring for a positively acting clutch, said clutch ring being adapted to cooperate with the cooperating clutch ring of identical construction, said clutch ring having clutch teeth, each of said teeth having faces lying substantially in a plane perpendicular to the axis of rotation of said ring, each of said teeth having a form profile which is of substantially exponential shape and each of said teeth is substantially tangent to a helicoid surface with constant lead at the pitch plane.

2. A clutch ring as in claim 1 wherein the exponential shape is defined by the formula $X = Ke^{ky}$.

3. A clutch ring as in claim 1 wherein each of said teeth has a substantial helicoid surface with constant lead at the pitch plane formed by flattening out the contact area at the mid plane.

4. The method of producing a tooth face clutch member which employs the use of a rotary milling cutter of disc shape having a plurality of cutting teeth arranged around its periphery comprising the steps of moving said cutter on a radius of said clutch member and in a path extending downwardly towards the periphery of said clutch member and indexing the clutch member by a prime number not evenly divisible in the total number of teeth and cutting another tooth.

* * * * *